June 2, 1970     S. R. BARNETTE     3,515,619
RESINOUS PLASTIC SHEETS, SHAPES, PANELS AND SLABS SIMULATING
OBSIDIAN AND QUARTZ
Original Filed Nov. 19, 1964     3 Sheets-Sheet 1

INVENTOR

STANLEY RONALD BARNETTE

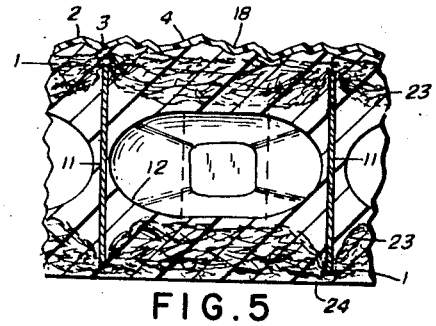
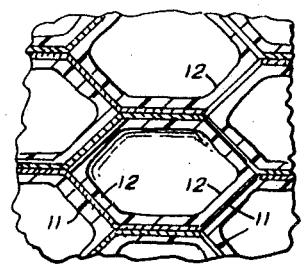
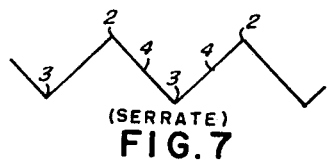
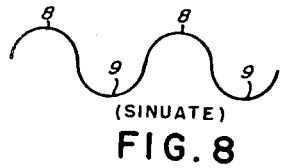
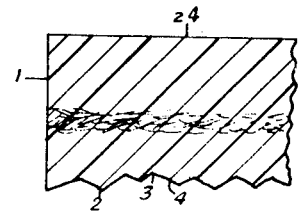
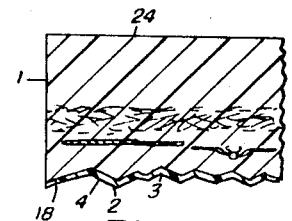
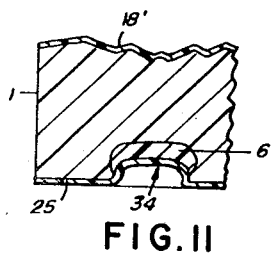
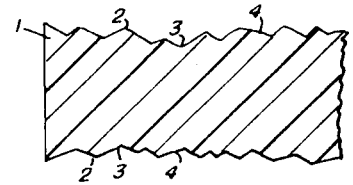
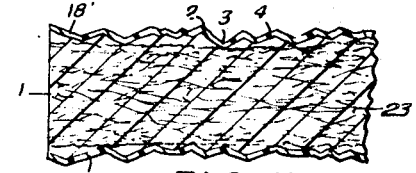
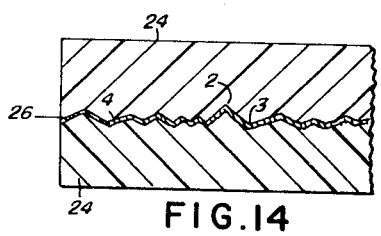
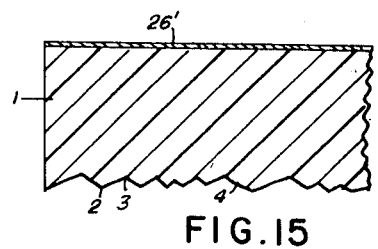
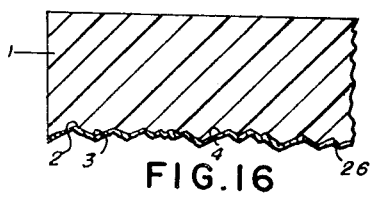
STANLEY RONALD BARNETTE
INVENTOR June 2, 1970  S. R. BARNETTE  3,515,619
RESINOUS PLASTIC SHEETS, SHAPES, PANELS AND SLABS SIMULATING
OBSIDIAN AND QUARTZ
Original Filed Nov. 19, 1964  3 Sheets-Sheet 3

STANLEY RONALD BARNETTE
INVENTOR

United States Patent Office 3,515,619
Patented June 2, 1970

3,515,619
RESINOUS PLASTIC SHEETS, SHAPES, PANELS AND SLABS SIMULATING OBSIDIAN AND QUARTZ
Stanley R. Barnette, 90 Cherokee St., Miami Springs, Fla. 33166
Original application Nov. 19, 1964, Ser. No. 412,516, now Patent No. 3,306,956, dated Feb. 28, 1967. Divided and this application Feb. 27, 1967, Ser. No. 618,596
The portion of the term of the patent subsequent to June 27, 1984, has been disclaimed
Int. Cl. B44f 5/00, 9/04; B29c 27/18
U.S. Cl. 161—5                                         15 Claims

ABSTRACT OF THE DISCLOSURE

A monolayered natural appearing plastic manufactured product of the type of quartz and obsidian comprising a compatible mixture of plastic simulation of resinous material with filler means reinforcement of which provides a unitary homogenous layer wherein the cured combined mixture of materials permits a matching of the refractive index and whereby at least the filler means appears transparent.

---

This article application is a divisional application of application 412,516 filed Nov. 19, 1964 which was a continuation in part of co-pending application 251,420 filed Jan. 14, 1963 which was an article divisional of application 808,599 filed Apr. 24, 1959. All prior applications have issued into patents: 412,516 issued as Pat. No. 3,306,-956 Feb. 28, 1967; 251,420 issued as Pat. No. 3,379,603 Apr. 23, 1968; and 808,599 issued as Pat. No. 3,072,973 Jan. 15, 1963.

The invention relates to a method of forming articles of laminated plastic by a casting process which includes having the articles in any desired shape or form and with plain or decorative surfaces and/or plain or decorative embedments.

The invention also relates to a method of cast laminating pearlized, plain, or patterned decorative sheeting and enveloping a core stock material so as to achieve a structural surfacing material and particularly to such methods utilizing plastic.

The invention contemplates the method of enveloping a core stock whereby to attain a product having bulk without excess weight and with full strength characteristics.

A further object of the invention is to provide a method wherein the core material is completely surrounded by plastic and adds materially to the strength of the finished itemed product.

Another object of the invention is to provide a method wherein the cast laminated material is provided with an extremely smooth or embossed effect, relatively hard surface.

In the event an embossed effect is desired, embossed sheeting of polyester film can be used and no coating is necessary as this material in itself acts as a ready release.

Any thermosetting or thermoplastic resinous material or matter which hardens with cure or setting, such as epoxy, polyester, styrene, methyl-methacrylate or any others, can be used in formulating the cast laminated sheeting and enveloping processes.

It should be understood that following the method and principles of the invention above disclosed that table tops, decorative panels, wall panels, as well as structural surfacing material of various kinds, may be formed.

It will be noted from the foregoing description that I have provided as an article of manufacture, a cast plastic sheet suitable for many uses, such as, for example, but not limited to table tops, and that said sheet has considerable bulk or as much bulk as may be desired, without any greater weight than that of the plastic, the bulk being provided to the extent desired by an insert or core whether wood, plywood, particle board, honeycomb, foamed plastic or any other filler, which is so embedded and in effect welded to the plastic material which surrounds it as to be integral. The cores can be of a wide variety and as light or as heavy as desired. The method or process of production is such that the sheet produced, whether with or without a core or filler, can be wholly or partially transparent and of any desired variety or mixtures of colors. By suitable embedments either per se or in addition to the core or filler, any number of beautiful designs and decorative motifs can be had.

This invention relates to an ornamental panel which is light transmitting and light diffusing. The invention also includes, among other features, ornamental ars est celare artem panels resembling obsidian, quartz, stained glass, a novel surface configuration of light-diffusing panels, including as one embodiment, resin rich peaks or sharp creases at a face of the article, and methods of making these and similar articles.

Panels of the invention are suitable for many uses including light transmitting elements resembling stained glass, room dividers, signs, windows, lamps, lamp parts, lamp shades and lamp cylinders, walls, awnings, curtain walls, patio and shower doors and structural panels in general, and may include an opaque layer so that light passing through the panel is reflected. The panels as indicated elsewhere herein may be of a flexible resilient nature as well as of a substantially rigid nature. They may be cast alone or cast with a core material, or other materials. The panels are prepared by a single casting of a liquid synthetic thermosetting or thermoplastic resin containing curing catalyst, in the preferred embodiment of the invention. Other liquid resins, such as fused thermoplastics, are also useful.

Briefly, the light diffusing properties of the panel are conferred by giving at least one face of the panel a rough surface having raised and depressed parts having a large proportion of sharp creases conforming to the creases obtained when a thin film or sheeting of a material such as a synthetic resin film, paper, metal foil, or other similar material as described below is folded, crushed, crumpled or crease dand then partially flattened, spread or opened. The raised parts or peaks are filled with cured in place resin which peaks are resin-rich and preferably free of any reinforcement such as glass fiber which is present in the body of the panel. The peaks shape a liquid resin and hold it to shape until the resin is set. Other aspects of the invention include panels having a rough, light-diffusing surface conferred by other means and in other configurations. The preferred configuration of panel face having sharp creases according to the invention gives an ornamental effect quite different from any previously known panels made by having a rippled, frosted, or stippled or other surface common to those familiar with the art of reinforced sheeting.

Another aspect of the invention is in varying the thickness of plastic light transmitting synthetic resin panels, by covering a cast flowable resin layer with a thin film, and while the resin is liquid evacuating the air bubbles and applying pressure to said film over a predetermined localized area, thus displacnig resin from said area. Preferably, the process includes conferring a rough light diffusing surface to the layer of cast, catalyzed liquid resin by means of a multi-creased film having raised and depressed parts (which also may be called sharp peaks or bosses and sharp crevices), by displacing the air in the peaks and crevices with liquid resin to form resin rich faceted peaks. The liquid is bossed by the creased film, which holds the resin to shape while it is curing. For this aspect of the invention, whatever form of film (smooth, creased, etc.) by maintaining a fixed localized pressure, displacing a given amount of resin, and maintaining the area of reduced thickness until the resin is set or gelled at least adjacent the impression, the light transmission in the thinner areas is enhanced and a debossed article useful in decorative panels, signs and similar articles is obtained. "Debossed" is defined elsewhere herein. Another aspect of the invention is in curing a panel of liquid resin to the soft gel stage, shaping the panel, in a form for example, and curing the shaped panel. Other features of the invention will become apparent, and, among others, a simple non-complicated means of dividing areas, framing edges, or depressing designs in an open mold, which heretofore would have been a complicated compression molding technique. In short, to a great degree it outmodes the compression molding machinery type of operation as is known today.

In the past, the roughened surfaces which confer light diffusing properties have been developed in plastic panels and glass by etching, embossing, and by means of films having raised and depressed portion conferred by chemical action or by shrinkage of synthetic resins during curing of the same. In the case of plastic films or foils wrinkled by chemical action, solvent action or shrinkage, the elevated or depressed portions have been relatively uniform in size and shape, rather vermiform in appearance, and in the form of convolute or sinuous elevations. In some cases they tend to orient in one direction or to form a monotonous, regular pattern. In cross section the elevations and/or depressions are relatively rounded and in some cases separated by flat portions of the film. While such wrinkled films are suitable for transmitting light and conferring light diffusing properties upon cast synthetic resins if sufficient care is taken, the complex nature of the procedure that must be used and the difficulty of accurate control are obvious disadvantages. Toxic or flammable solvents such as acetone and methylethylketone are commonly used in quantity, and problems may arise, for example in connection with the thickness of film used. Thus, weak or thin spots in the film may be dissolved completely and may cause apparent flaws, and thicker films may require an extended period of time to achieve the desired rough or wrinkled surface. Often the decorative, ornamental, esthetic effect leaves much to be desired.

Other methods of providing light diffusing panels of synthetic resins are known. These include providing a mold surface having a regularly recurring pattern such as a stippled surface, and sand blasting or chemical etching to obtain a frosted surface. Another method includes the use of a pre-embossed polyester film means and casting thereupon a plurality of layers by my cast-laminating technique, as taught by my earlier patent, No. 3,072,973.

One aspect of the present invention mentioned above is an improvement over earlier methods of providing light diffusing panels of synthetic resin, particularly by using a single casting step in making a cured resin product. The improvement other than the one pour feature comprises briefly, mechanically creasing a thin sheet of film to provide a multiplicity of elevated and depressed parts, utilizing such sheet to provide a mold surface, casting upon said surface a unitary layer of light transmitting synthetic resin, containing a curing catalyst if necessary, said resin being in liquid form, leveling said unitary layer, and curing the same. Preferably a second, similarly creased mold surface is applied to the top of the leveled unitary layer of liquid resin, which liquid is bossed and held to shape thereby. The preferred method of obtaining said creased film is to crumple, crush, draw and squeeze the film to provide a major proportion of sharp creases. The film is then partially spread and the resin cast thereupon. If made with a transparent resin, the panel is semi-transparent, and in a view normal to the face of the panel, presents multiple, irregular, random jewel-like and prism-like facets. A "semi-transparent" panel as used herein is defined as a panel such that, when it is placed against printed matter, for example newsprint, the printed matter can be read, and when the panel is raised a short distance, for example 0.5 inch, the panel becomes translucent to the observer. Such a panel is pleasing esthetically and provides improved light diffusing qualities at the same time. The creased film may be a permanent part of the panel or may be stripped therefrom and may be of various adherent or non-adherent materials and either opaque, transparent, or translucent, either colored or colorless, and with or without designs or patterns imprinted thereon. Such panels are useful in semitransparent windows, for example as a product resembling stained glass, in luminaires to provide indirect and/or diffuse light, and in connection with another aspect of the invention, the panels are useful in the manufacture of signs for display, as well as decorative articles having designs which present a localized debossed effect, to give marked contrasts of light transmitting properties.

This latter aspect of the invention has also been mentioned above, and comprises casting a layer of said catalyzed liquid synthetic resin suitably containing a color such as a dye, pigment or other material, which material controls the amount of light transmitted through the panel, depending upon the thickness of the panel or portions thereof, placing a thin film on the top of said liquid layer, and applying localized pressure in areas conforming to the desired design, thus forming an impression in the layer by simply displacing the liquid resin, and maintaining the pressure until either the entire liquid layer is set to a gel or even cured, or at least until the resin adjacent the impression is set. To obtain best results, it is essential to incorporate a reinforcing web, mat, or sheet (such as a mat of nonwoven continuous strand or chopped strand glass fiber) having sufficient body to prevent displacement of an excessive amount of liquid resin from the debossed impression area. The latter result can be expedited by using a heated member to apply the pressure and using a thermosetting resin. The thin film is desirably sharply creased as described above in connection with another aspect of the invention to provide a mold surface and to provide a panel surface which shows multiple irregular, random jewel-like and prism-like facets at a face of the panel. Where a thin film itself is the mold surface, it may be a permanent part of the finished panel if desired.

An additional feature of the invention is a simplified method of forming a reinforced light-transmitting panel having contiguous areas of resin having different colors. Instead of for example laminating preformed pieces of molded partially cured colored resin to a substrate, or even printing colored areas, the present improvement includes simply casting portions or increments of liquid, catalyzed colored resin in contact with one another, mechanically forming a mottled design by intermingling the cast liquid increments, immersing a web of glass fiber or other reinforcement in the liquid layer, followed by curing the resulting unitary layer to obtain the ornamental panel of the invention, having a homogeneous resin structure with heterogeneous colors.

Another aspect of the invention which is primarily due to the creased film, is to provide a means whereby the reinforcing mat is maintained and positioned at substantially equal distances from the surfaces so as to provide a resin rich layer on both top and bottom areas. By this structure, a non-warping, balanced panel or sheet is obtained, with a one pour method.

A similar procedure provides a simplified method of making a decorated "honeycomb" cored panel, without adhering a rigid, preformed skin to the core, each facing instead being supplied by the use of a single casting of a reinforced layer of liquid resin.

These and other aspects of the invention are shown in the accompanying drawings and described in greater detail elsewhere herein.

FIGS. 1 through 4 are photographic renderings of panels made using a mold surface containing sharp creases corresponding to that obtained from a mechanically creased sheet of film, and illustrates the nature of the raised and depressed parts of the panels which present multiple, irregular, random jewel-like and prism-like facets in a view normal to the panel. FIGS. 2 and 3 illustrate a structure useful as a sign for display or an ornamental window. Instead of an abstract design, as shown in FIGS. 1 and 4, the opaque material may be in the form of a graphic representation, for example a sign.

FIGS. 5 and 6 show panels of the invention in which two of said panels are made in such a way that they are secured together in generally parallel relationship. In the embodiment illustrated they are secured together with a honeycomb core material, and the construction is much simpler than similar prior panels.

FIGS. 7 and 8 illustrate schematically types of raised and depressed parts which may be encountered in creased and/or wrinkled films. As illustrated such parts may be serrate or sinuate, or in accordance with the preferred embodiment of the present invention, the parts are a combination thereof, which may be defined as serrate-sinuate, irregular, and predominantly serrate.

FIGS. 9–20 illustrate embodiments of the invention with a reinforcing means, or with various transparent, transulucent, opaque, and reflective or mirror-like layers.

Figure 1:
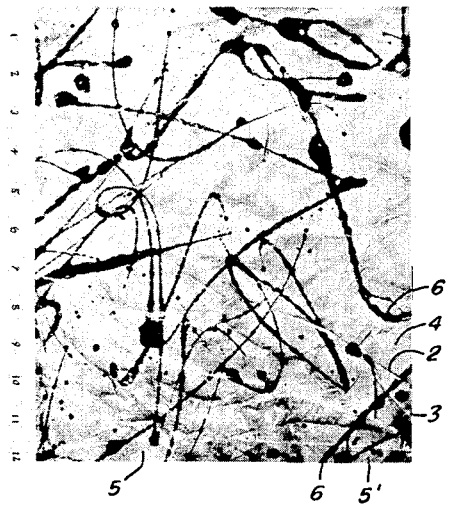
Figure 2:
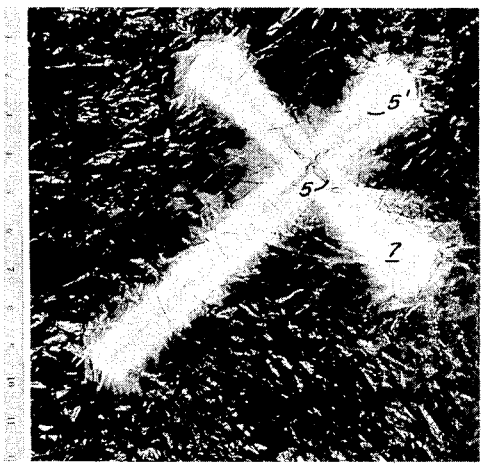
Figure 3:
Figure 4:

Referring to the drawings in greater detail, FIGS. 1 through 4 show the surface configuration conferred upon the panels of the invention by mechanically creasing a thin sheet of film such as a plastic film, waxed paper, or other material as disclosed elsewhere herein. The raised parts 2 form sharp creases as do the depressed parts 3. The panel 1 as shown in FIGS. 1 and 4 comprise an opaque design 6 formed from an opaque liquid, catalyzed synthetic resin placed in the body of the resin of the panel 1 or placed upon the film having raised and depressed parts, from which a mold surface is provided. If placed upon the film, the resin of the design 6 may be cured before or after casting the final layer or panel 1. The design 6 is varied as desired, and only partially covers the film, in discrete areas, as in an artistic design, lettering for a sign or other desired form. When the resin of the design is such that it shrinks upon curing, or if heat evolved in curing the design softens or stretches the film, if the resin 6 is cured before casting the resin, a slight indentation 34 (FIG. 11) is formed. This emphasizes the design.

The random resin rich jewel-like and prism-like facets 4 provided by the creases in the mold surface are particularly well shown in FIG. 3. These facets are not perfectly planar but form irregular facets between the raised and depressed parts.

The shaded areas 5, 5' (FIGS. 1 to 4) are different colors, and are prepared by providing a number of portions of substantially transparent liquid resin containing the catalyst, each portion being tinted or pigmented preferably with a different non-fading color. These portions are then distributed, by pouring, in a plurality of increments over the area, contiguous to other increments, thus defining a unitary layer to give the panel 1.

The improvement of FIGS. 2 and 3 is a panel having a design formed by a localized area 7 which transmits a greater amount of light than the remainder of the panel. Factors which influence the depth of the impressions 7 include the thickness of the top film, the area covered by the impression member and the pressure exerted upon the area, the viscosity of the liquid resin, and the thickness and resilience of reinforcing material in the layer of resin. The impressions 7 are much greater in depth ($d$ of FIG. 21) than the maximum or average difference in height between the raised parts and the depressed parts defining the facets. The improvement of FIGS. 2 and 3 is useful with various wrinkled or unwrinkled films.

The esthetic appeal of the product depends upon control of the sizes of the facets and the depths of the creases. Thus, while a sand-blasted surface having a frosted appearance could in some cases and to some extent resemble the illustrated cross-section but on a microscopic scale, the esthetic effect would be entirely different. Similarly, the light diffusing and light transmitting properties would have little or no resemblance to the properties of the panel of the invention.

The facets are generally polygonal in shape, it being understood that they are not strictly so since the sides of the polygons are not necessarily straight lines. Their final shape depends upon the type and extent of creasing. These outlines of the generally polygonal shapes are defined by raised creases and depressed creases. It is to be understood that the depressed creases and raised creases may merge with one another, and in many cases do so.

The distance differential between the raised and depressed portions and it determines to a great extent the optical properties, the jewel-like effect, and other esthetic properties of the article. Thus, for instance a tinted panel transmits light to a different degree through the part of a facet adjacent a depressed crease than through a part adjacent a raised crease. Although dimensions outside of this range for the height are useful, smaller heights than given detract from the esthetic qualities and larger differences affect the light diffusing qualities of the resulting panel. The dimension is the average horizonal distance between the highest side or raised part of a facet and the opposite lowest side or depressed part of a facet, and determines the number of facets within a given area to provide more, or less, design density.

There are several advantages in mechanically creasing a thin sheet of film and particularly doing this in such a way that the partially spread sheet has raised and depressed parts with a large proportion of sharp random creases. Control of the creasing of a sheet, and control of the light diffusing and light transmitting properties of a panel cast upon the mold surface having a shape conforming to the creased sheet is achieved. In the prior art methods, wrinkling sheets by solvent action, chemical action, or shrinkage of a resin cast on a foil, control is difficult, as indicated above. Further there is an improvement in the esthetic and light transmitting qualities of a panel produced by the use of a step including mechanical creasing of a film.

The mechanical creasing of the thin sheet of film is performed in a variety of ways. One way is practiced by placing a large sheet of the film on a planar surface and manually crumpling or crushing it by holding the sheet down to within an inch or two of the surface and randomly gathering portions of the sheet and bringing them together to provide the creases, exerting sufficient force to provide sharp creases. The gathering is desirably done in a plurality of directions, but random creases can also be obtained by gathering the film together in the same direction thus giving creases which are still random but are somewhat parallel to one another.

Still another method is to gather and crumple the sheet into a ball, desirably partially opening or spreading the sheet and removing the ball by gathering the material from another direction. These methods may be by hand or machine, and batch-wise or continuously. A variation for producing somewhat parallel creases is to wring or twist the sheet in a manner analogous to wringing a wet towel, by hand or machine. If the sheet is wrung or twisted along the direction of one of the two major dimensions of the sheet, followed by partially flattening the sheet and wringing or twisting it along the direction of the other major dimension, a surface configuration showing the random, irregular, jewel-like and prism-like facets is also obtained. A further variation is to gather an end of the sheet and feed it to resilient driven rollers. If desired the sheet may then be fed to a second set of said rollers, but feeding the sheet at right angles to the first step. Other methods will be obvious to those who become skilled in this novel art. The film is then partially spread to provide raised and depressed parts, a major proportion of which are in the form of sharp, angular creases. The film is then utilized to provide a mold surface for casting a resin in conjunction therewith to impart a surface configuration to the synthetic resin corresponding to the creased film. This may be done by casting the liquid resin upon the film and whether or not reinforcement is used an important aspect of the invention resides in the step, after casting the resin, of then placing the film upon the cast resin, followed by removing air pockets without permanent flattening and in such a manner that the creases are retained. While there are alternative methods such as mentioned below, this is preferred.

Other ways of placing said mold surface and one face of said layer of liquid resin in liquid deforming contact with one another over their entire juxtaposed faces are feasible. For example, it is possible to cast the resin in a location such that a major dimension of the panel is vertical, but this method is more difficult to apply, and to set up apparatus to practice, particularly where a reinforcing web or a core are to be used, but can be done either with a permanent core or a removable core (see FIG. 28). The preferred method is to use the creased film on a horizontal surface or to cast upon a horizontal surface and place the film upon the resin, and removing air bubbles while the resin is liquid, if desired. Normally, bubbles in the liquid resin layer are allowed to rise through the reinforcement web and burst before placing a top creased film, and any bubbles which rise later, along with air trapped by the top film, can be removed by means described below. Although it is preferred to utilize the creased film itself as the mold surface, either as a permanent part of the resulting panel or which is strippable and is removed after completion of the panel, the shape of the mold surface provided by the wrinkled film may be transferred into a permanent solid form which solid form then provides the mold surface. In the latter case, a parting medium such as a silicone composition, a polytetrafluoroethylene composition, paste wax, liquid wax or lecithin would be used on the mold surface.

It is highly desirable to incorporate a reinforcing mat or core into the interior of the layer of cast liquid resin. This reinforcing material is preferably readily wettable by and permeable to the liquid resin, and may be a non-woven mat of glass fiber, such as a continuous strand mat, a woven textile of glass fiber or thread, a thin sheet of paper of glass fibers, metallic strands, textile strands, and woven or non-woven textiles of other fibers such as of polyamides, polyesters, stretchable threads, polyurethanes, cellulose, linen, or other fibers. The reinforcing material may also be a thin plastic film compatible with and adherent to the casting resin, in which case it desirably has holes therethrough to lock the resin through the reinforcement. The reinforcement is preferably of non-woven glass fiber of about the same index of refraction as the resin. The selection of glass fiber and resins to provide panels in which the fiber is invisible is readily achieved according to the present invention by use of a low ratio of glass fiber to the formulated resin. In earlier methods of forming reinforced sheeting of synthetic resins, a common procedure has been to simply saturate a non-woven mat of glass fiber with curable resin, followed by forming the mat as with corrugated mold plates, and curing the resin. Such prior panels commonly have a weight ratio of glass fiber: resin of 2:3 (e.g., a panel about ⅛ inch thick with 8 oz. of glass fiber and 12 oz. of resin per square foot), and glass fibers are visible, particularly at the surfaces of the panel. According to the present invention a "resin-rich" peak panel is preferred, and is obtained by the present invention. By "resin-rich" is meant a weight ratio of glass fiber:resin of between about 1:3 and 1:40, more preferably between about 1:5 and 1:30. The thickness of a preformed glass fiber reinforcing sheet, when such reinforcement is used, is preferably less than the minimum thickness of the panel, to provide a fiber-free outer resin surface of the panel. It is important that the reinforcement material be kept as close to the center of the resin sheet to eliminate warpage problems. When reinforcing materials other than glass fiber sheets are used, it is also preferred that the resin surface is free of such materials. Such result is obtained by the present invention.

The thin sheet of film may be of any material which can be mechanically creased. Suitable properties have been found to exist in "Tedlar" which is a film of polyvinyl fluoride sold under the given trademark by E. I. du Pont de Nemours. This film may be transparent, translucent, or opaque, and of any desired color. While the normal untreated polyvinyl fluoride film is useful as a strippable film it also is well adapted to use as a permanent part of the finished panel. This requires special treatment of the film. Known methods include that of U.S. Pat. No. 2,871,144 where a surface of the polymer film is treated with a tetrahydrofurane solution of a addition compound of metallic sodium and an aromatic hydrocarbon: the method of U.S. Pat. No. 2,941,912, comprising a treatment of the surface with organic phosphites such as di-n-butyl phosphite; the method of U.S. Pat. No. 3,067,078 comprising etching a surface at an elevated temperature by a material such as a solution of an alkali metal alkoxide; or by the method of U.S. Pat. 3,111,450, comprising coating a film of polyvinyl fluoride with a polyurethane such as from polyethylene glycol and toluene diisocyanate with a linking agent such as a diamine.

If the panels are to be used in a locale where they are subjected to ultraviolet light and they contain dyes, pigments, resins, or materials subject to deterioration such as embrittlement and fading by such light, the casting resin or the film permanently adhered thereto may contain a material which screens or absorbs ultraviolet light. One such process is disclosed in U.S. Pat. No. 2,970,066. A film of polyvinyl fluoride, polyvinylidene fluoride, or other polymers are coated with an ultraviolet absorbing material, for example by reacting a surface of the film with benzoyl compounds such as 2,4-dihydroxybenzophenone and an isocyanate such as methylene-bis-(4-phenyl isocyanate.

Other useful films include polyesters such as polyethylene terephthalate, sold under the trademark "Mylar" by E. I. du Pont, polyamides, polyethylene, polypropylene, polyvinylchloride, a copolymer of a major proportion of vinyl chloride and a minor amount of vinyl acetate, waxed paper, aluminum foil, copper foil, oiled paper, and other films or foils which may be mechanically creased and formed into a self-sustaining mold surface or used to provide such mold surface. Useful films include those disclosed in my prior U.S. Patent, No. 3,072,973, used with a plurality of layers. The films are either strippable from, or permanently adherable to the cured resin of the panel.

Panels may be formed either batch-wise or continuously. Referring particularly to a batch method, the same will now be described. An open top mold having a leveled bottom and upstanding sides is provided. A film is mechanically creased and partially flattened, and is placed in the bottom of the mold. Desirably, it is draped over the mold edges or it may be clamped or secured near the edge of the mold bottom as shown at the right side. When a top creased film is applied, it is similarly draped or placed in relation to the mold sides or bottom. The liquid, catalyzed synthetic resin is then cast in a single pouring or in multiple pourings upon the mold surface provided by the creased film. The body of liquid resin is preferably sufficiently fluid to be self-leveling, and spreads itself over the film. The inherent surface tension and capillary properties of the resin cause it to rise to form a fillet or meniscus at points where the resin comes into contact with the mold walls. This fillet is enhanced in the event the resin is leveled to the edges by hand operation. After a short period of time, ranging for example from 5 minutes to one hour, depending upon the concentration of catalyst and/or accelerator, the thermoplastic or thermosetting resin begins to cure, as a result of which heat is evolved in the exothermic reaction and the cure is further accelerated. The liquid resin layer is cured at least until it is set or gelled and the panel may be handled, and the panel may then be removed from the mold or table, placed upon an auxiliary supporting surface, or locked into a formed position to further cure and set. For example, a cabinet with doors on opposite sides and a plurality of horizontal shelves is useful when placed between two tables for making panels. While a panel or sheet on one table is setting to a gel, the workmen may prepare a resin sheet on the other table. Then the first panel is placed on one of the shelves, and the table is ready for immediate reuse. The cabinet suitably has ten to twenty shelves spaced an inch or two apart, and may have heating coils to accelerate the cure and help in adhering the film to the panel. With the doors closed, the heat generated by exothermic curing is also trapped and utilized.

Instead of allowing the liquid resin to cure as described above in connection, a second mold surface formed from a creased film may be placed directly upon the surface of the unitary layer. This is accomplished for example by means of a roller and wooden blade preferably in such a manner that air is expelled from under the upper film. After the resin has set or gelled but before it has cured to a rigid state, the panel may be formed to any desired shape. For example, it may be shaped to give a curved panel in the form of a segment of a tubular cylinder. More complex shapes, such as a chair seat and back may be conferred upon the gelled panel, after which curing is completed.

Continuously forming a resin panel is also possible. A precreased film is continuously placed upon a moving conveyor means, supported by means such as a trough. The liquid resin is then cast, either in a single stream or layer, or in increments to obtain a unitary layer, upon the creased film. The resin is of course compounded with materials such as curing agents, accelerators, dyes or pigments, stabilizers, ultraviolet absorbers, or other materials. For instance, such materials are metered to a pipe or pipes, or a reservoir or reservoirs, containing a liquid resin, which is then cast. As described and shown elsewhere herein, a continuous permeable reinforcing mat of glass fiber (or other reinforcing material, with or without the simultaneous, previous, or subsequent placing of decorative media in the layer of resin) is continuously and completely immersed in the layer of liquid resin. A pre-creased top film, if used, is then continuously placed upon the upper surface of the liquid layer of resin. A roller gently pushes the film into face-to-face juxtaposition with the liquid resin, and removes air from under the film. While a single roller can be used, a plurality may also be used, and they may be arranged at any useful angle to the direction of movement of the panel. A knife or blade, of wood, resilient material such as rubber, or other material which will not scratch the top film, is used similarly to the roller to remove air from under the film. A plurality of knives is also useful, at suitable angles to the path of the liquid resin layer. A reciprocating motion, such as would be given by a hand operation, may be given to the air removing means.

FIGS. 9 through 20 are illustrations of panels in partial cross-section, which may be prepared by the methods illustrated. The panels of course are not necessarily oriented in these figures in the same manner in which they are formed; that is to say, the panels may be formed with the bottom and top in the location shown in the figures, or in most cases may be formed in the reverse order. For example, in FIG. 10, the irregular surface adjacent the film 18 may be at the bottom of the liquid resin layer during formation thereof, and a smooth or planar surface 24 may be the top surface. On the other hand, the mold surface upon which the liquid resin layer is cast, such as the glass sheet 29 of FIG. 20, may provide a smooth or planar surface 24, and the irregular surface may be provided from the top of the liquid layer. While most of the figures do not show a reinforcing sheet, web, or mat 23 such as is shown in FIGS. 9, 10 and 13 it is preferred that such mat be used. The mat 23 is preferably incorporated in the liquid layer after pouring said layer by placing the permeable reinforcing material on and into the top of the liquid resin, wetting the same, and causing the resin to pass through and surround the reinforcement 23. Other methods of course can be used, but create problems such as bubbles and a resin-poor surface, which can be corrected, but with some difficulty. Thus, the material may be pre-soaked with resin, or the resin may be cast on top of the reinforcing material and caused to wet the material. The creased film 18 may be adhered to the cured resin panel 1 as illustrated in FIG. 10, or may appear on both faces of the panel. Particularly if the panel is solely for interior use in a building structure, desirably the film is stripped from the panel.

FIG. 11 illustrates the result of draping a film 25 upon a casting surface and forming discrete lines into a design by distributing a colored opaque or transparent liquid resin 6 over a portion of the area of the film 25. Since most catalyzed casting resins shrink and/or give off heat during curing, the resin of the design may shrink, or the heat may soften and stretch the film, drawing the film away from the mold bottom to form a slight lip or depression 34 (FIG. 11) in the form of an indentation in the film 25. The drawing up takes place in the manner illustrated when the design is formed with a liquid catalyzed resin and the resin of the design is allowed to set to a firm or solid state prior to casting the liquid resin layer from which the solid resin panel 1 results. This further emphasizes the discrete design. The design may be of an opaque resin or of a translucent or transparent resin.

FIGS. 12 and 13 illustrate preferred embodiments of the invention in which both faces or sides of a light diffusing and light transmitting panel comprise sharp creases as crevices and protuberances, particularly such that the panel is semi-transparent and presents multiple, irregular, random jewel-like and prism-like facets. As shown, the creased plastic film may be removed from, or permanently adhered to, one or both faces of the panel.

Figure 17:
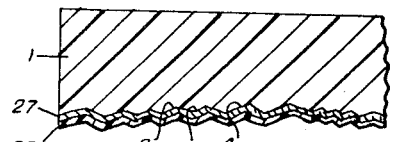

FIGS. 14, 15, 16 and 17 illustrate panels comprising a reflective foil 26, 26' or an equivalent reflective film, foil, or powder, which forms a permanent part of the panel. The reflective material may be mirror-like as is the polished side of aluminum foil, or it may be somewhat light diffusing as is the specular or frosted side of one common form of aluminum or as is a thin layer of bronzing powder. Where aluminum foil is used, it may be electrolytically anodized to form an oxide film, which may be dyed any desired color, or printed with a design. The foil may be incorporated in a singular layer of liquid resin, followed by casting the said resin in successive increments. Alternatively, if the foil is perforated, it may simply be placed upon a layer of the liquid resin and immersed therein. The reflective film is preferably opaque as would be metal foil, and it may be placed upon or form the smooth or planar side of the panel as illustrated in FIG. 15, or it may provide the creased and partially flattened film which is the mold surface 26 as in FIG. 16. FIG. 17 illustrates a product which may be obtained by metallizing or otherwise coating a plastic film 28 with a light-reflective material 27. In this instance, the laminated or coated film serves as the mold surface and is permanently adhered to the resulting panel of cured synthetic resin.

Figure 18:
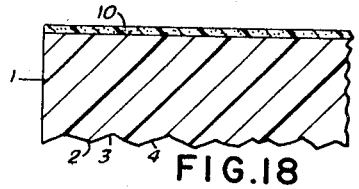
Figure 19:
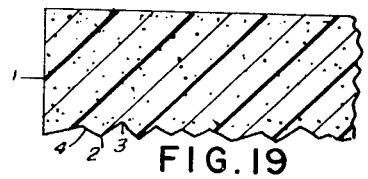

FIGS. 18 and 19 illustrate embodiments in which a pigment such as titanium dioxide is incorporated in the liquid catalyzed resin itself as appears in FIG. 19 or which may be applied as suggested FIG. 18. In the case of FIG. 18, the pigmented layer is either a coating upon a light transmitting film 10 or is incorporated throughout said light transmitting film. Another variation useful for the panel as shown in FIG. 18 is to cast a separate layer 10 of liquid catalyzed synthetic resin containing the pigment. In these figures the pigment is preferably present in a quantity which makes the panels translucent, at least to light directed thereupon, as viewed from the opposite side. These panels are useful in luminaires and other utilities where it is desirable to have a highly diffused white light.

The panels of FIGS. 18 and 19 are well adapted to use in luminaires. Desirably, the film or layer 10 is of a material which absorbs or screens ultraviolet light, or is of a material such as "Tedlar" which contains an absorber for such light. Panels such as shown in FIGS. 9 through 13 and FIGS. 18 through 20 are useful with illuminating means.

Figure 20:
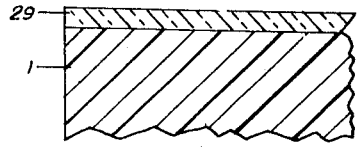

The embodiment of FIG. 20 is preferably formed by using a glass sheet 29. Preferably the glass forms the bottom mold surface and the transparent liquid resin is cast thereupon, followed by placing a mold surface such as film against the liquid resin layer in liquid-deforming contact therewith over the entire juxtaposed faces of the liquid resin layer and the mold surface, followed by curing the resin to obtain the cured resin. If the resin is nonadherent to glass, the panel may be stripped therefrom. On the other hand, materials such as epoxy resins will permanently adhere to the glass, and even in the case of non-adherent liquid or cured resins, the glass may be coated with an epoxy resin or other glass-adherent material. As suggested above, it is preferred to use a structural reinforcing material within the liquid resin.

The following is an area of the invention which merits special attention. In order to prepare a synthetic resin panel having a colored pattern therein, for example a pattern resembling stained glass, and including a multiplicity of resins having different colors wherein the colored areas are contiguous to one another to form a unitary mottled design, one method as shown in the October 1962 drawings and described in the specification of applicant's Patent No. 3,072,973 used by the applicant is to provide dams or temporary divisions to separate areas resin, curing the resin, removing the temporary division means, and filling the valleys with additional liquid resin which cures to form a unitary layer. When it is desired to incorporate a reinforcing medium this is done either in the individual areas or after curing or partially curing the individual area, removing the temporary division means, and casting an additional layer of resin, which forms a self-bonded article. Another method has been to form a reinforced panel of a resin having a single color, repeating this with other colors, cutting the individual panels into sections, and laminating these sections to another layer of resin or other material to form a unitary panel, as shown by U.S. Pat. No. 2,905,580.

A much simplified method is provided by the present invention. This method involves casting increments of light transmitting colored, liquid catalyzed synthetic resin, from portions of liquid resin having different colors, in the form of a mottled design to form a unitary layer. It has been found that an especially satisfactory method involves practicing this method in such a way that contiguous areas of resins having different colors are cast to form a unitary panel, and even overlap one another to provide combinations of mottled colors. After casting such a vari-colored layer, a further mottling, if desired, is achieved by inserting the tines or fingers of means such as a generally hand-shaped resilient comb in the resin, and applying a swirling or back-and-forth wiping motion, or stroking motion. This one-pour method, with a single unitary layer of cast resin, is much simpler than a method using a plurality of layers. The resin, as discussed elsewhere herein is preferably a transparent resin, and the resulting panel is preferably semi transparent as defined herein. This improvement involves casting a unitary layer of colored, liquid, catalyzed synthetic resin with a design therein, placing a permeable matting of glass fiber or equivalent reinforcing material over the entire area of said unitary layer, surrounding the mat with the resin without substantially disturbing the design, and curing the resulting reinforced liquid layer to form a light transmitting panel having the design visible from both sides. Preferably a film such as "Mylar" or "Tedlar" is placed on the top of the liquid layer before it is cured. This serves to protect air-sensitive resins and also improves the flatness of the resin sheet. Further, air pockets are readily removed.

In greater detail, FIG. 38 of applicant's divisional Pat. No. 3,306,956 illustrates certain aspects of the invention in outline flow sheet or diagrammatic form. As indicated by the legend the principal or basic steps are indicated by boxes from solid lines surrounding the steps and solid arrows proceeding to the next step, while additional steps within the invention are indicated by broken lines. The principal steps are: First, casting increments of light transmitting colored liquid curable synthetic resin in a mottled design to form a unitary layer on a casting surface. The resin is preferably one which is curable by means of a curing catalyst as defined elsewhere herein, either a thermosetting resin such as an unsaturated polyester-styrene copolymer or a thermoplastic resin such as polymethylacrylate polymerized in the presence of a suitable catalyst. However, as indicated above, other techniques may also be utilized to provide the unitary layer of liquid resin. The casting surface is preferably the crumpled and partially flattened, or spread or opened solid film having sharp creases as described above, although casting surfaces of other configurations are useful with the steps of the said FIG. 38: Second, placing a reinforcing material, such as a continuous strand nonwoven mat of glass fiber, over the entire area of the liquid layer resin, and causing the colored mottled design to wet the mat, and to permeate and pass therethrough and surround the same; and Third, curing the resin to obtain a light transmitting panel having a design visible therethrough from either side of the panel. As suggested, the reinforcing mat is preferably of fibers of about the same refractive index as the cured resin, whereby it is substantially invisible to the naked eye in the finished panel, particularly when a high ratio of resin to fiber is used, and where the refractive index has been matched.

Decorative media, preferably in the form of discrete solid design elements such as a transparent, translucent, or opaque cured resin design as shown for example in FIGS. 1, 4 and 11, natural plant leaves, natural leaves treated to remove all but the lace-like network of veins, mother of pearl flakes, tinsel, butterflies, as shown in FIG. 10, or other discrete design elements are useful. The discrete design elements are placed individually or are previously adhered to the reinforcing material or to a highly permeable material such as a gauze-like sheet of very thin cellulosic paper. Where the latter is used, the cellulosic fibers become substantially invisible in the panel. The solid design elements, of course, are placed upon the casting surface either before casting the liquid resin of step (1) of the said patent of FIG. 38, as suggested by step *a*, or placed upon the surface of the cast layer of liquid resin from step (1) as suggested by step *b*. In the event the steps follow the route (1), then *b*, in step (2) the porous web of glass fiber or other reinforcing material forces the design elements downwardly further into the layer of liquid resin. If step *a* is utilized, the reinforcing web or mat maintains the decorative media within the layer of resin. Whatever steps are to be used, the mottled design formed by increments of different colored resin is substantially undisturbed by the decorative media or design elements, or by the reinforcing mat placed therein.

An additional optional step (not shown in FIG. 38) includes the placing of decorative media as discrete solid design elements upon the surface of the liquid resin following step (2), then proceeding to step 3 with or without step *c* or step *d*. This is preferably performed when opaque areas or an opaque effect is desired.

Where the route is directly from step (2) to additional step *c*, a structural core is placed on the upper surface of the liquid resin containing the embedded reinforcing mat or web. In the event the structural core is a honeycomb as illustrated in FIGS. 5 and 6, as shown it is preferred that the fillet 12 rises from each side to an extent that it entirely covers the honeycombed member 11, either by the fillets themselves or with the aid of a film of resin the fillets on each side are joined to those of the other side. Entrapped monomer vapors help in forming such film of resin on the honeycomb. When step (3) and step *e* are then followed, a structure similar to that shown in FIGS. 5 and 6 is obtained. Other structural cores which provide rigidity and strength to the finished panel are useful. In the event they are opaque, such as wood, plywood, particle board, or foamed plastic, the light transmitting mottled design is visible through the thickness of the layer of resin up to the depth at which the structural core or opaque material appears. In the case of honeycomb, of course the open structure thereof provides visibility of the design from either side.

Additional step *d*, that is, covering the liquid resin with a film, is suitably used between the steps (2) and (3), following a procedure similar to that shown in FIG. 6.

While it would seem impossible to form a bubble-free product by applying the creased film of the invention to the horizontal top surface of a liquid resin to provide the faceted surface, several conditions, steps, and factors are believed to contribute to this highly desirable result, as has been discovered in connection with the present invention. The shaping of the resin face takes place by pressure-free contact conformation of the resin to the film, air displacement being achieved by progressively moving meniscus formation. One important step involves the manner of placing the creased film which, if properly done, largely avoids entrapped air under the higher parts of the faceted film. This is performed so as to take advantage of the tendency of the liquid resin to form a meniscus, above the normal liquid level, when in contact with a vertical or inclined surface. To decrease bubbles, the manner of manipulating the film is important, it being advantageous to begin contact of the film and resin at a single point (e.g., at a corner or at the center of the creased film) or along a line (as at an edge of the creased film) similarly to the manner illustrated in FIG. 6 of Pat. 3,306,956. A second important feature in manipulating the film is the speed with which the remainer of the film is brought into contact with the remainder of the resin surface, once the initial point or line contact (which is summarized by the phrase "spot contact") has been made. This rate is such that, for most liquid resins, when starting at one end of a 10 foot long panel; between about ten seconds and about five minutes is normally utilized to gradually bring the remainder of the film, progressing from the initial spot contact, into contact with the remaining liquid surface. This time of course will vary for different resins and films, and depends largely on allowing the meniscus to develop and progress along with the progressive contact of the film and resin. Thus, a thick, viscous casting syrup such as the acrylic syrup sold under the trademark "Lucite" by Du Pont may require a slower progressive contact of the film and resin from the initial spot contact, than would be required by a more fluent liquid. In using a very low viscosity resin the meniscus may progressively form at a much faster rate. The angle between a plane generally following the length and width of the sheet (hereinafter called the "plane of the sheet"), and the horizontal surface of the resin at the point of contact is also critical to some extent; it should be as small as possible but greater than 0°, and less than 90°. Stated another way, this angle of inclination of the plane, of the sheet being progressively brought into contact with the surface of the horizontal layer of liquid resin, is thus desirably greater than 0° and less than 90° at the point of contact of the two. Preferably, it is between about 1° and about 30° for most effective results. The rate of progressive contact must be at least slow enough to allow a meniscus to form, and to permit the meniscus to follow the changing contour of the creased film, thus positively displacing air from the peaks. A very simple test for a given resin and film is to follow the steps discussed above, and adjust the rate of progressive contact until it is observed that bubble entrapment under the film is at a minimum, that is, the rate and angle of progressive contact are such that the meniscus progressively forms and follows the changing contour of the sheet. Another test, on a laboratory scale, is to immerse a spatula or knife blade in a water glass or beaker of the liquid resin at an angle of inclination of about 10° to 20°. By moving the blade down into the resin at varying speeds, the rate of immersion or of progressive contact at which formation of the meniscus is prevented (with consequent bubble formation in practice) is readily determined. The importance of the angle of inclination is that, with a high angle (90° or greater), a small meniscus with a low slope is formed, whereas at an angle of about 30° or less, the meniscus becomes larger and steeper, which permits the meniscus to follow the varying contour of the creased sheet while still positively displacing air, and preventing bubbles. If the contact is too swift or is simultaneous over the entire surface (0° inclination), bubble formation is increased. Graphic demonstration of the importance of these phenomena is supplied by a table knife to simulate the film and a glass of colored water to simulate the resin; the importance of a low angle of inclination and the rate of contact becomes clear immediately. The creases themselves contribute to enhance meniscus formation. This can be demonstrated by holding a table knife vertically in contact with the side of a glass of water or liquid resin at an angle to said side; it will be noted that the meniscus is higher at the smaller angle, which simulates a crease. Another demonstration may be provided by curing an inclined creased film partially in contact with a resin surface, and cutting the cured panel at various points to observe the meniscus. It is also apparent that mass production techniques must be designed with these factors in mind.

At times, a few bubbles are trapped inadvertently, or are belatedly released by the permeable reinforcing material, if used. It has now been found that these bubbles can still be removed, in spite of the fact that they are held by the faceted peaks or faceted raised parts of the film and at the same time the destruction of the multi-faceted surface configuration is avoided. Somewhat surprisingly, if the peaks or raised parts are temporarily depressed and flattened to release and move bubbles to the edge (as suggested by Pat. 3,306,956 FIG. 6), the creased nature of the film causes it to spring back and remain in contact with the liquid resin. This is another important step in producing a bubble-free sheet.

The foregoing and other hypotheses and theories expressed herein are intended to assist in explaining the invention, but the invention is not to be limited thereby.

To restate broadly the improvement of the said FIG. 38, while the unitary layer of resin containing a design is still liquid, a porous web of non-woven glass fiber or equivalent material is spread over the entire area of the liquid layer, the web is wetted with the liquid resin, as the web is immersed within the liquid layer with the colored design substantially undisturbed, so that the resin permeates and passes through the mat and covers the same. The resin is then cured to obtain a light transmitting panel having the design visible therethrough from either side.

It is considered that one of the more important features of novelty in the combination of steps of the said FIG. 38 is the "one pour" method of obtaining a panel having a decorative design therein and a reinforcing web of glass fibers or equivalent material. Another feature is a simplified method to obtain a structure such as shown in FIGS. 5 and 6. In the past, a common procedure for combining a honeycomb core with light transmitting synthetic panels has been to utilize a preformed cured synthetic resin sheet and to apply an adhesive or a cast layer of synthetic resin thereon (with or without ornamental designs of ornamental media within the second cast liquid layer of resin or adhesive), followed by placing a honeycomb core in the layer of liquid resin or adhesive. The resin or adhesive may conventionally contain a reinforcing web. By utilizing a one-pour method of supplying a liquid layer of synthetic resin containing color, such as pigments or dyes, in the desired mottled design, followed by immersing a reinforcing material therein and placing a honeycomb core in contact with the reinforcing web, covering the top of said honeycomb with an air tight material such as a film, to insure the entrapment of monomer and other fumes which will thereby coat the paper core, and forcing the same downward with a force which crushes and compresses the reinforcing web, while the resin is in liquid form, and too, the maintaining force is substantial and in conjunction with the knife edge of the honeycomb material further compressing the reinforcing mat to a relatively small proportion of its original thickness at the point of contact, a number of steps required by the prior procedures are avoided. (Examples of prior art procedures may be found in Bacon U.S. Pat. No. 2,477,852, and in British Plastics, pages 201–205, June 1952, and my U.S. Pat. No. 3,072,973.) Thus it may be seen that by using the procedure of the said FIG. 38 in combination with step c a decorative panel having excellent strength characteristics may be obtained utilizing an uncomplicated procedure. The liquid synthetic resin layer containing the decorative design as provided by step 1 of the said FIG. 38 may be cast upon a smooth surface, an embossed surface such as the mechanically creased film providing jewel-like and prism-like facets or upon any other surface such as those conventional in the art. FIG. 5, for example, shows a honeycomb core 11 of paper, metal, synthetic resin, textile fabric or equivalent material securely bonded to the synthetic resin panels 1 on each face of the honeycomb. The decorative design is such that light transmitted from one side of the panel to the other passes through the transparent synthetic resin containing dyes or pigments to provide tinted, mottled, varicolored semi-transparent patterns or areas, giving a pleasing esthetic effect. The honeycomb material 11 and the fillets 12 give additional strength and esthetic properties to the product, particularly where the resin completely covers all surfaces and faces of the material 11 and thus is unitary from one face of the panel to the other with the resin of each side of the panel directly connected to the resin of the other side providing a unitary, locked-through structure. It is to be understood that the figures are not necessarily to scale. For instance, the portion of the resin which coats the honeycomb material 11 and connects and joins the fillets 12 is suitably only thick enough to cover the surfaces of the honeycomb material. Thicker coatings, as shown, are useful where still greater strength is required. As is known, even though the material 11 of the honeycomb is quite thin as illustrated, when a transparent or semi-transparent panel is viewed in a direction normal to a face thereof, the fillets 12 give the effect of a much thicker, sturdy honeycomb. The apparent thickness of the honeycomb web is much greater than it is in fact. A bubble-like effect is also provided by the reflection of light from the curved surface of the synthetic resin enclosing the gas or vapor or empty pocket space defined by the filets 12 and the cured resin panels 1.

While the honeycomb-cored panels illustrated in FIGS. 5 and 6 have one smooth or planar face 24, the other face 18 having the jewel-like and prism-like facets 4 defined by elevated parts 2 and depressed parts 3, both faces may be the same.

Figure 21:
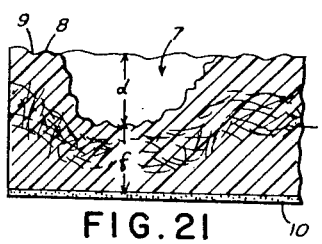
FIGS. 21 and 24 are related to FIGS. 2 and 3, and illustrate the impressed designs in localized areas while the synthetic resin is in a liquid state, to obtain the debossed article.

FIG. 21 shows the designs formed by localized areas 7 which transmit a greater amount of light in the remainder of the panel (further shown in FIGS. 2 and 3) and useful for preparing signs, ornamental windows, and similar articles. While these figures illustrate the preferred embodiment of the invention wherein a film having sharp creases is utilized, it will be apparent that embossed films, smooth films, or films having other configurations may also be used to form designs 7, as noted in my U.S. Pat. No. 3,072,973.

Where the impression member encloses an area of the film, as in FIG. 3, the fact that the creased film is frictionally engaged by the impressing member, and where a thick or viscous casting liquid is used, the flow of resin may partially smooth the creases in the enclosed area. In many cases, the viscosity of the resin is such that the liquid resin forms a slight thickening of the panel adjacent the impression 7. By analogy, when a stone is placed in water, the water is simply displaced, and no appreciable change in pressure is conferred by the presence of the stone. Thus, while the stone makes an "impression," there is no real pressure exerted by the stone upon the water. In the present situation, of course, the film resists deformation to some extent, and if the synthetic resin layer is reinforced with a web such as of glass fiber, the film and the web may provide resistance to deformation. Pressure due to the weighted design element is thus primarily upon the film and/or the reinforcing web, and that upon the resin is basically related to the viscosity of the resin and its resistance to flow. Accordingly, when reference is made to applying localized pressure or to forming an impression in a liquid layer of synthetic resin, it is to be understood that the preferred result is that the liquid resin is displaced from its location, and that any pressure upon the liquid is to force it to a location away from the localized impression.

FIG. 21 represents an article such as a decorative panel or sign, useful with natural or artificial illumination. The impression 7 is formed with a mold surface or film having raised parts 8 and depressed parts 9 which are rounded or provide a sinuous cross-section. Such rounded parts are less preferred than the sharp creases. As shown, the mold surface, such as a wrinkled film, has been stripped from the panel 1. A light diffusing layer 10, similar to that shown in FIG. 18, is adhered to a planar face of the panel. For example, the depressed parts 7 in FIG. 24 may represent panes resembling stained glass, and the elevations therebetween may represent metallic lead strips (as by painting with a metallic paint) between the panes. By forming an impression adjacent a border of the panel as at the left side of FIG. 24, means for glazing or attaching a frame is provided.

Figure 22:
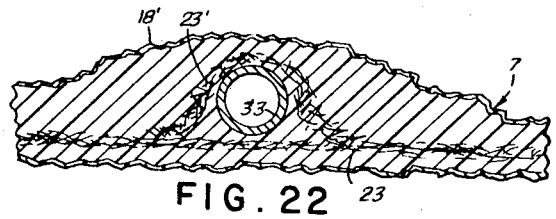
FIGS. 22 and 23 show a metal cylinder and spring assembly.
Figure 23:
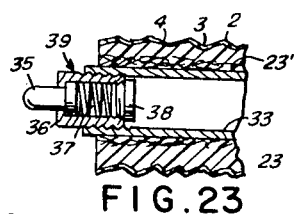

The structure of FIG. 22 is prepared similarly to the structures and methods shown in FIG. 23 but, after placing the reinforcing web or mat 23 upon the surface of the liquid resin and surrounding it with liquid resin, the structural element 33, in this case a metal tube, is placed upon the surface of the liquid resin and embedded therein, and a second narrower strip of reinforcing material 23' is embedded in the liquid resin. This is followed by placing the film 18' thereupon as described heretofore, and by placing an impression member upon the surface and displacing the resin from under the member to form impressions 7, and fully embed the structural element. The structural member 33 may be of any desired configuration but is desirably of a relatively rigid metal such as copper, aluminum, or steel. It may be tubular, or a solid rod, and cylindrical or rectangular in cross section, or of any desired configuration.

As shown in FIG. 23 such structural member may be provided with means 39 for mounting the resulting panel as a structural unit, such as a wall. The structural member 33 may extend the full length or width of the panel, or alternatively may extend only partly therethrough simply to provide a convenient means for incorporating the means 39 for securing the panel in its place of use. The illustrated mounting or securing means 39 is a conventional spring lock means for mounting panels and doors, in some instances, so that they may be pivoted about the axis of the securing means. The mechanism illustrated comprises a pivot member 35 urged into engagement with cooperating mounting means (not shown) at the location where the panel is to be mounted. Usually, the cooperating mounting means comprises a bracket having a hole therein for receiving the pivoting or mounting member 35. The pivoting or mounting member is pressed into engagement with the mounting means by spring 37, the cap 38 and sleeve 36 providing a housing. This housing is suitably provided with threads which match cooperating threads on the structural element 33.

Figure 24:
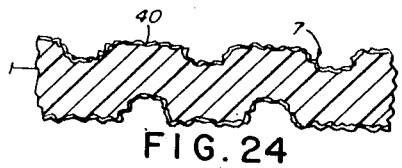

FIG. 24 illustrates another embodiment of a structure having parallel localized impressions 7 and parallel flattened portions 40 to provide a structure having increased light diffusing properties, in view of the prismatic effect of the impressions 7 and flattened portions 40 being directly opposite one another on opposite sides of the panel. Increased strength is conferred by the ribbed nature of the structure.

Figure 25:
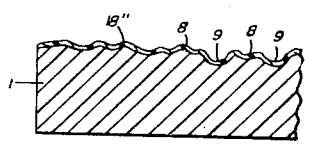
FIG. 25 shows types of shallow, regular, rounded, vermiform wrinkles obtained.

FIG. 25 is illustrative of the prior art structures having rounded or sinuous raised and depressed parts 8, 9. The wrinkled film 18" is provided for example by shrinkage of the resin during curing or by chemical action of solvents or other materials prior to formation of the panel 1. The invention illustrated in FIGS. 2, 3, 21 and 24 is applicable with the film creased according to the present invention, as well as with wrinkled, embossed, or smooth films.

Figure 26:
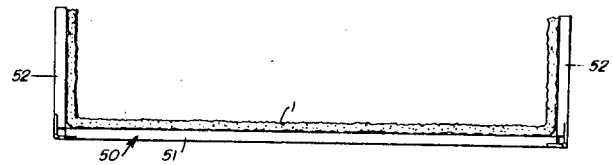
FIGS. 26 through 28 show basic completed shaped structures.

FIG. 26 shows diagrammatically a table means 50 having movable parts 52 attached by means such as hinges to a stationary element 51, useful to shape resin panels. The faceted resin sheet 1, having creased film on the upper and lower faces thereof, is partially cured to the soft gel stage in the horizontal position, and then the hinged elements 52 are moved to the desired position, vertical in this case. If needed, clamps (not shown) may be used to prevent the upright portions of the resin sheet from slumping. The resin is then cured to the rigid stage while being held in the position shown.

Figure 27:

FIG. 27 shows, diagramatically, a modification for shaping. Spring means 62 are clamped to a table by means of clamps, and after the sheet is formed and reaches the soft gel stage, the clamps are removed, and the spring means moved to its normal shape. After curing to the rigid state, the panel is removed. Other apparatus and shapes, including complex curves, are also useful.

Figure 28:
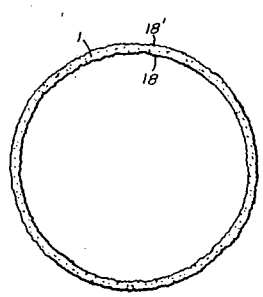

FIG. 28 shows a cylinder element. Creased films 18, 18' are secured between an inner form and an outer form, the axis being vertically disposed, as by clamping using split ring forms or other means, or adhesives. The resin 1 is then introduced between the creased films and allowed to cure. If both forms are removed, a cylindrical article such as is shown in FIG. 28 is obtained. If the inner form is permanently secured to the film 18, a structural element such as a column is obtained. While a cylindrical article is shown, it may be of triangular, rectangular, ellipsoidal or any other cross-sectional shape.

There the resin is cured without a top film, and air is the atmosphere in contact with the upper surface, it is desirable to use a resin composition which is not adversely affected by curing in contact with air. Where curing in air of, for example, a thermosetting unsaturated polyester-styrene mixture is done, it is good practice to use a wax additive in the last-poured resin, so that the curved surface will not be tacky. A useful basic formula for addition to such resin is a mixture of 45 lbs. of polymer grade styrene in which 6 cakes (1.2 lbs.) of household paraffin wax has been dissolved. From this batch an amount of about one 6 oz. cup is added to 45 lbs. of the liquid resin mixture. This leaves a dry hard surface, slightly cloudy, which however, can be buffed and polished to a high shine.

Where a curing cabinet having a plurality of shelves, as described above, is used, it may be modified to permit curing without air. Thus, if the doors referred to slide upwardly, means may be provided to seal off from the atmosphere such upper shelves as are in use. Thus, if the top of the cabinet is in sealing relationship with the sliding doors, and the edges of the shelves are spaced slightly in a horiznotal direction from the sliding doors, by providing the bottoms of the doors with resilient rubbery gasket means which engage the edge of an adjacent shelf, the upper shelves are sealed off from the atmosphere. By providing a door with a valve, and with a hose connected to a vacuum means or a source of inert gas such as nitrogen, air can be removed from any desired number of shelves. By providing four synchronized sliding doors, four work tables may be placed around the cabinet. The heating means mentioned above is suitably in the form of radiant heating coils on the bottom of each shelf.

Suitable casting resins are well known to those skilled in the art, and examples are given below. Preferred are homogeneous bulk polymerization procedures wherein the monomer or monomers, partially polymerized polymers, and mixtures thereof, in liquid form, are mixed with a suitable catalyst, initiator or accelerator, with other materials such as dyes or pigments, and the mixture is then cast and cured. As used herein, "liquid resin" includes liquid monomers curable to a solid resinous state. Methyl methacrylate polymer and unsaturated polyester-styrene copolymers are well known examples. Details of the methods of formulating and casting liquid monomers, monomer-polymer syrups, or liquid polymers are given in the literature, for example by Schildknecht, Polymer Processes, Vol. X (1956), for instance at pages 53–58, 462–471, 552–624, 763–786, and the references cited therein.

The monomer or resin liquids or syrups are preferably those which are polymerized or cured by a chemical compound, referred to herein as a curing catalyst, at room temperature or at elevated temperatures, and at atmospheric pressure. The resulting polymers are preferably thermosetting (infusible), for example the epoxies and the thermosetting polyesters, although thermoplastics, such as the acrylics, and linear polyesters, are also useful. In fact, thermoplastics which may be fused are useful with known fusion techniques.

Specific examples of useful monomers and polymers include allyl esters such as diallyl phthalate, diethylene glycol bis-allyl carbonate (sold under the trademark CR 39 by Pittsburgh Plate Glass), triallyl cyanurate (sold by American Cyanamid), copolymers of diethylene glycol bis-allyl carbonate and methyl methacrylate, a copolymer of a vinyl monomer such as styrene with an unsaturated polyester for example prpeared by condensation of maleic acid or fumaric acid with ethylene glycol or propylene glycol, acrylic and methacrylic acids and esters thereof with or without dissolved or suspended polymers thereof, epoxy resins in the liquid, uncured state such as sold under the Shell Chemical Co. trademark "Epon" (suitably a liquid low molecular weight polymer from polyhydroxy compounds such as phenols or glycols, for instance glycerol, and epichlorohydrin), and other light transmitting resins well known to the art.

An example of a thermoplastic resin useful by fusion techniques is a plastisol of a copolymer of 85–95% of vinyl chloride and 5–15% vinyl acetate or vinylidene chloride in the form of finely divided particles suspended in di-2-ethylhexyl adipate or dioctyl phthalate plasticizer. The proportions are such that the plastisol is flowable, (e.g. 100 parts resin and 60 parts plasticizer). It is cast and used similarly to other resins as described herein, with the exception that it is fused, as by the use of radiant heat, to form a homogeneous clear liquid resin. Simple cooling sets the resin. Such plastisols may, as is known, be made thermosetting by substitution of a suitable reactive monomer for a portion of the plasticizer. Another example is the same resin in powdered form, which assumes a liquid state when fused. Other thermoplastic plastisols or powders are also useful. The resin, particularly where fusion techniques are used, should be one which is not seriously degraded by contact with air, or should be utilized out of contact with air. The latter can be achieved by use of a vacuum, an inert atmosphere, or an infusible film to protect the resin.

The resins are modified by known compounding ingredients such as stabilizers to prevent oxidation, embrittlement or other degradation processes, flameproofing materials, or other such materials if desired. An example of a flame retardant unsaturated polyester containing a chemically combined hexahalocyclopentadiene and a chemically combined phosphorus compound such as tris methylol phosphine oxide, is described in U.S. Pat. 2,931,746. Compounding ingredients which do not adversely affect the light-transmitting properties of the panel are of course required.

Conventional curing catalysts (variously referred to in the trade as curing agents, initiators, and accelerators, the latter term often being used to designate a supplemental curing catalyst where two or more such materials are used together) are used.

For epoxy resins suitable known curing catalysts include diethylene triamine, para-phenylene diamine, diethylene triamine, pyridine, piperidine, diethylaminopropylamine, and other amines. Organic acid anhydrides and other materials are also useful as curing catalysts, as is known. Preferably, the quantity of curing catalyst is such that the mixture of catalyst and epoxy resin contains approximaley one epoxy group for each active hydrogen or anyhdride group, although slightly more or less curing catalyst may be used. The amount of curing agent or curing catalyst is normally about 5% to 20% based on the weight of the uncured epoxy resin. Reactive solvents may be used in some instances following well-known procedures.

As curing catalysts or polymerization catalysts for the allyl esters, the acrylic monomers, and the polyesters, soluble organic peroxides are useful, in some cases with accelerators or promoters such as the organic acid salts of certain metals. Examples of suitable catalysts effective between about room temperature and about 50° C., preferably used with accelerators discussed below include tertiary-butyl hydroperoxide, cyclohexanone peroxide, methylethylketone peroxide, and others known to the art. These are of course in most cases also effective at higher temperatures. Other known catalysts do not become effective until higher temperatures are reached. Examples of such other peroxide catalysts which become effective only at high temperatures are benzoyl peroxide and di-tertiary butyl peroxide. The reactions using such peroxy compounds are exothermic and the temperature reached depends to some extent upon the quantity of catalyst and/or accelerator present. Useful accelerators or promoters include nickel naphthenate, nickel stearate, cobalt naphthenate, cobalt stearate and other known accelerators. Quantities of curing agent such as methylethylketone peroxide normally range from about 0.1% to 4% by weight of the resin, and quantities of promoters such as cobalt (added for example as the naphthenate) normally range from about 0.01% to 1% by weight of the resin. A relatively high exotherm, that is, a high temperature reached within the body of the panel due to the exothermic reaction, is desirable in some cases to achieve a quick cure and to achieve a strong bond between surfacing films and/or reinforcing webs or mats. For example, in the case of "Tedlar" films treated to be adherent to the casting resin, high temperatures of the order of 40° to 100° C. are beneficial. Similarly, when a non-woven glass fiber mat has been treated with a thin coating of an epoxy resin to facilitate bonding of the glass fiber to other materials, a high exotherm is desirable. The exotherm, of course, should not be so great as to volatilize components of the casting resin, thus causing bubbles, and should not be so high as to cause degradation of the synthetic resin. An alternative to a high exotherm is the use of externally applied heat. Of course, casting resins and curing agents are known, and are useful, which permit curing at about room temperature. Useful reinforcing webs or mats are well known. For example, woven glass fiber yarns or non-woven felted mats have long been used as reinforcement for synthetic resin panels. The glass fibers have commonly been treated with compounds such as epoxy resins, diallyldiethoxysilane, allylotrichlorosilane, and reaction products of trichlorosilane to promote adherence to the casting resin. Examples may be found in U.S. Pat. 2,763,629 of such treatment for promoting adherence of glass film to unsaturated polyesters or allyl esters. Chromium compounds such as Werner complexes and epoxy coated glass fiber webs or fabrics have also been used, as shown for example in U.S. Pat. No. 2,746,896. The epoxy resins for example are suitably applied from solution in organic solvents if they are normally solid resins, and if they are partially cured resins the mat may be lightly impregnated with uncured epoxy resins followed by treatment including curing in the presence of a known curing catalyst. The mat of course is desirably previous to and wettable by the casting resin.

The invention can be practiced with any form of thermoplastic or thermosetting liquid means. Examples are clearly outlined in applicant's divisional Pat. No. 3,306,956 columns 22–26.

EXAMPLE 1

A sheet of "Mylar" polyester film (a trademark of E. I. du Pont de Nemours Company, Inc., the film being of polyethylene terephthalate) 1 mil in thickness and approximately five feet by 12 feet was crumped into a ball approximately six inches in diameter, the ball was partially uncrumpled and recrumpled, thereby providing creased areas randomly arranged. The "Mylar" polyester film was then opened, partially flattened, and spread upon a horizontal table, having a low mold wall and being slightly over four feet by ten feet in size. Decorative media in the form of black lines, opaque in nature, was then placed upon the surface of the film by pouring or dribbling a thin stream, non-uniform in width, of the resin over the surface of the creased film. The design is a matter of choice, and for example, it may comprise the step of using generally circular motions to form overlapping spirals, or the lines may be streamed back and forth across the film, and then at right angles thereto, back and forth across the film to form the desired abstract design. Drippings and droplets, as well as a combination of such motion were used. In this example, the lines covered only a small proportion of the creased film, less than 5% of the area thereof, and in this instance the opaque resin applied was then allowed to set. The opaque liquid resin contained 11.28 ounces of an unsaturated polyester resin containing styrene monomer (PE9405, sold under the trademark "Plaskon" by Allied Chemical & Dye Co., Plastics and Coal Chemicals Div.), black pigment paste in the amount of 6% by weight of the resin (Ferro, "VF" black pigment), 0.10 dram (apothecary) of cobalt naphthenate (containing 6% Co), and 2% by weight of the resin of methyl ethyl ketone peroxide, 60% concentration, which were combined immediately prior to forming the design as described above.

After the opaque discrete design elements (corresponding to the design 6 as shown in FIGS. 1, 4, and 14, for example) were set, a unitary layer of synthetic resin containing a mottled design, formed of different colored liquid catalyzed synthetic resin increments, was poured upon the spread film and over the set design. The liquid layer was approximately 1/8 inch in thickness, or calculated considering the vapor loss which takes place, at 3/4 of a pound of liquid resin per square foot. For 1/4 inch of thickness, 1 1/2 lbs. per square foot would be introduced. The liquid material curable to a solid was 34 pounds of acrylic modified unsaturated polyester resin (Reichhold Chemical Company, DD-568, known as 93-073). In this instance, to secure a setting time of 40 minutes, 6 ounces of promoter was added (ED-793, a Reichhold Chemical Company accelerator). This amount of resin was divided into five equal portions of 6.8 pounds each, and after adding a permanent color, dye or pigment to each portion, 1/2 fluid ounce of methyl ethyl ketone peroxide (60% concentration) was added to each portion as a setting catalyst.

The five portions of resin were respectively colored light green, light yellow, light olive, light amber, and light orange, and each was essentially transparent in layers of the thickness used in the panel.

Each of the portions of differently colored catalyzed liquid material was poured in a plurality of increments spaced from one another for a given color, said increments being between about two inches and 10 inches in diameter after they had spread by natural flow within a short period of time, for example, one minute. After each of the portions of colored resin was poured in increments and the creased film covered thereby, the mottled design was apparent. In this example, no attempt was made to maintain a clear line of division between different colors and in fact, they were overlapped, and partially intermingled by hand after pouring, giving additional colors and shades. A non-woven glass fiber mat 1/8 inch in thickness, approximately 4 feet by 10 feet in length and width, weighing one and one-half ounces per square foot, manufactured by Owens-Corning Fiberglas Company, and coded M-9600 continuous filament, a reinforcing mat, was placed upon the liquid resin. In a few moments the liquid resin had wet the mat and had passed through and surrounded the mat without substantially disturbing the colored mottled design.

A "Tedlar" film (a trademark of E. I. du Pont, the film being of polyvinyl fluoride), creased in a manner similar to the previous applied "Mylar" bottom film and about 1.0 mil thick, was spread and placed on top of the layer of liquid resin over the mat of glass fiber in the manner described elsewhere herein to minimize air bubbles. The few bubbles trapped were mechanically removed to obtain a bubble-free article. One side of the film was adherable to polyester resins, and this face of the film was placed adjacent the liquid resin. The resin was then cured to obtain a light-transmitting panel, having the design visible therethrough from either side. The depressed creases spaced the mat so it was centered in the sheet (see FIG. 16) and was overlaid with fiber-free resin surface zones. Upon fully curing, the untreated, non-adherable "Mylar" was stripped and the chemically treated "Tedlar" remains a part of the sheet. It should be noted that the reverse procedure of applying the two films could be used, and that the "Tedlar" film also will act as a release medium if not treated, as mentioned above.

EXAMPLE 2

This example followed the procedure of the foregoing example except that a clear resin was used. It was cast in such a manner as to form a panel approximately 1/8 inch in thickness. Another difference was that, instead of forming a design by pouring a thin stream or dribbling a thin stream of decorative resin, other decorative media in the form of discrete solid design elements comprising the lace-like vein structure of leaves, and gold colored tinsel, were placed in the liquid resin under the reinforcing web or mat, the top film placed thereupon, and the air was removed.

EXAMPLE 3

A procedure similar to Example 1 was followed, using different colors, and subsequent to placing the top film, weighted impression elements corresponding, for example, to the designs shown in FIGS. 2 and 3, as well as other designs, were placed upon the top film. Force was applied by weights to displace the liquid in the area of the impression, causing a debossing of the liquid embossed ornamentation as defined by the raised and depressed parts of the creased films, and the raised and depressed part under the impression member were substantially diminished in magnitude. The impression elements thus served to hold the liquid resin to shape, until cured. The term "debossed" is defined herein as the combination of partially flattening the film under the impression member, displacing the liquid resin and holding it to shape, the term debossed also being applied to the so-treated areas in the cured panel. The resin was then cured and the impression elements and weights were removed.

EXAMPLE 4

A "Tedlar" film of about 4 by 10 feet and about 1.5 mils in thickness was gathered at each of the narrower ends and tightly twisted or wrung about its longer dimension, each end being twisted in a direction opposite to that of the other end, until a generally cylindrical rope about 3/4 of an inch in diameter was obtained, after which the film was spread upon a horizontal surface. The film then presented elongated, generally parallel prism-like and jewel-like facets.

A design of catalyzed opaque liquid synthetic resin similar to that used to form the design of Example 1, was dribbled in a thin stream over the surface of the film in a deliberate pattern and permitted to set. A clear resin consisting of acrylic modified unsaturated polyester resin (HU-332, now coded 32-032, Reichhold Chemical Company), to which an additional amount of 8% Du Pont Company acrylic monomer (methyl methacrylate) was added in the amount of 34 lbs. The resin had an added promoter system or accelerator previously incorporated by the manufacturer and only required the addition of methyl ethyl ketone peroxide (60%) as a setting catalyst or medium. For this example, 5 1/2 fluid ounces were added as a setting catalyst.

The clear resin was cast upon the film over the opaque resin after the latter had cured, and a creased film was placed over the upper surface of the liquid layer and air expelled from under the film. After curing, the panel was trimmed.

A clear transparent sheet of uniform thickness, with permanently bonded film faces, is obtained by placing very smoothly on a leveled horizontal table a treated adherable "Tedlar" film as a base and in turn after casting the liquid layer, applying evenly a top "Tedlar" smooth film, taking care to evacuate air bubbles and leveling the top film with a guided level blade working from on top of the film. The film added with further add structure to the plastic sheet.

EXAMPLE 5

A procedure similar to Example 1 was followed up to the point immediately following placing the reinforcing web or mat in the layer of resin.

At this point, a honeycomb of stiff kraft paper, as manufactured by Union-Bag Camp Company, having hexagonal openings about ¾ inch across and a thickness of about ⅜ inch was spread open and placed upon the glass fiber mat. The top honeycomb surface was covered with a film and weighted with a flat rigid board. The bottom edge of the honeycomb was depressed into the fiberglass mat and maintained in contact therewith within the resin to the extent described below, and the resin was allowed to set.

After the resin was cured, a clear layer of the 34 lbs. resin was cast upon a smooth planar surface previously coated with a separating material. The separating material was a mixture of 25 parts lecithin and 75 parts mineral spirits, which was applied to the smooth surface and carefully wiped dry. A mat of glass fiber corresponding to that described in Example 1 was then placed upon this clear layer of resin, the glass fiber mat was wetted with the resin and embedded therein, and the honeycomb was then turned over from the preceding operation and the exposed face was placed against the glass fiber, depressing said fiber and causing the liquid to rise above the edges of the paper, and filleting the resin at the exposed edges of the honeycomb, forming a structural panel article made in a single pour operation for each side of the honeycomb. The viscosity of the resin, and the honeycomb materials, were chosen so that the fillet or meniscue 12 extended at least ²⁄₃₂ inch up the thickness of the honeycomb core on each side when placed in each liquid layer, and so that the resin or vapors therefrom completely covered the surfaces of the paper honeycomb. It should be noted that by covering or sealing the top open face of the honeycomb during the setting period, that the fumes or vapor are restricted from escaping and causes the paper honeycomb, in this instance, to be fully saturated causing a complete wet-out. If this were not done, the fumes would escape and the paper would appear uncoated and the feature of added strength would be lost.

EXAMPLE 6

A resilient, flexible panel about ¹⁄₁₆ inch in thickness was prepared using top and bottom vinyl fluoride films treated to be permanently adherent to the casting resin. The panel was prepared similarly to Example 1 with a difference that the reinforcing media was ¾ ounce per square foot chopped strand mat as manufactured by Ferro Corporation and coded as MS-HSB Uniformat, and the resin was of a wholly flexible formulation, of unsaturated polyester styrene (manufactured by Reichhold Chemical Company and carrying a code number of 8151). Also used as the similar American Cyanamid resin, coded as 4134, used in the amount of 24 lbs. It was similarly divided into several portions each of which was colored a different color as in Example 1 the exception being that only 10 drams cobalt naphthenate (6% Co) promoter alone was added to the entire 24 lbs. and ½ fluid ounce of MEK peroxide (60%) was added to each color and casting the resin increments as in Example 1.

EXAMPLE 7

The procedure was similar to Example 1, except that pouring, metering, or dribbling was in a pattern to create random dams, approximately ⅛ inch in height, enclosing areas completely separated by the dams or grouting lines. The grouting lines could be of any material desired by the designer, whether of clear transparent, colored transparent, or any design of pigmented color. When the grouting lines set, the colors are introduced into the separated areas to level with the top edge of the dam separate colors being placed in the separate areas, producing an article while simulates stained glass. A plurality of colors in each area, as in Example 1, is also attractive. Preferably the grouting lines are pigmented to a metallic silvery or lead-like color. A cake decorator's frosting dispenser is well adapted to provide the grouting lines.

EXAMPLE 8

The procedure of Example 1 was followed, with the difference of using a commercial liquid epoxy resin ("Epon" 815 as supplied under the given trademark by Shell Chemical Company) and a conventional catalyst of hardener ("Ciba" 956, manufactured by Resin Coatings Company) were used. For a description of "Epon" resins in addition to that given in the Shildknocht text as noted above, see Zimmerman et al., Handbook of Material Trade Names, Supp. 1, Ind. Research Service Inc. (1956).

EXAMPLE 9

The steps of Example 1 were followed except that the bubble-free panel containing the top and bottom films was placed in a form having a U-shaped cross section at a point when the resin had gelled but was not yet rigid. At this point, the resin is no longer flowable, but it can be deformed as by bending the panel and cured in the deformed position. Herein, this is called the "soft gel" state. After placing the panel in the form where it sagged into contact with the form, the resin was curved and the shaped article was removed. Instead of moving the panel to place it in a form, the casting surface may have movable elements which are placed in the desired position after the resin is gelled to the non-flowable state. For example, a form made of a plurality of leaf springs secured together and in the relaxed position having the desired shape, such as a U-shape, is placed on a horizontal surface and the spring elements clamped to the horizontal surface to make a flatbed. The panel is formed thereon as described above and when the soft gel stage is reached the clamps are released and the springs return to their normal position. The panel is then cured and removed from the form.

Another example of a suitable resin formulation appears in my earlier application Ser. No. 251,420, filed Jan. 14, 1963, now Pat. 3,379,603. This comprises a total of 384 ozs. thermosetting resin, 7 ozs. purified styrene, 3⅔ ozs. MEK-Peroxide, and ½ oz. cobalt.

What I claim is:

1. A cast-plastic manufactured panel utilizing a transparent filler means for structural support resembling obsidian, quartz and stained glass and wherein resinous materials used have a matched refractive index with said filler means permitting a transparent product comprising: cured transparent synthetic resin of randomly varied thickness, said panel characterized by a fillet-like projection adjacent the periphery said layer being made up of a plurality of areas of said resin with color, said areas being unitary with contiguous areas, said areas being distributed over the total area of said panel as defined by a plane following the maximum dimension thereof; producing prisms whereby the resin rich sharp creased peaks are dense in color and the shallow creased crevices appear colorless in the light refraction and being sufficiently closely spaced along said plane for conferring transparency to said panel.

2. The panel of claim 1 in which said surface has a large proportion of sharp creases and presents a multiplicity of irregular, random, jewel-like and prism-like facets in a view normal to said panel.

3. A cast plastic product resembling obsidian, quartz or stained glass comprising: cured synthetic resin of randomly varied thickness, said product characterized by a fillet-like projection adjacent the periphery, producing prisms of resin-rich sharp creased peaks and shallow creased crevices.

4. The panel of claim 3 wherein at least one face of said panel has a pigmented grouting adhered thereto.

5. The panel of claim 3 in which two panels are used and each back of said panel is self-adhered to a core media means in what is termed a curtain-wall sandwich construction.

6. The panel of claim 3 in which at least one face of said panel has a film adhered thereto.

7. The cast-plastic panel of claim 6 in which said film is textured.

8. The panel of claim 3 containing a partially flattened debossed design of a depth greater than said variation in thickness.

9. The cast-plastic panel of claim 3 which contains an invisible continuous strand structural glass fiber reinforcing web.

10. The panel of claim 3 which further contains decorative media embedment material.

11. The panel of claim 3 which has multi-colors.

12. The cast-plastic panel of claim 11 in which said colors are spaced apart by grouting lines.

13. The panel of claim 3 in which a foil is inserted in said panel.

14. A light transmitting and light diffusing cast-plastic panel utilizing a transparent reinforcing web means which matches the refractive index of a transparent resinous means comprising: a layer of cast, cured transparent synthetic resin means, said layer characterized by a fillet-like projection adjacent the periphery thereof in its as-cast condition, at least one of the two major faces of said panel having deep dimensional raised and depressed resin rich parts, a large proportion of which are in the form of sharp, angular creases such that said panel is transparent, and in a view normal to said panel, said raised and depressed parts present multiple, irregular, random, jewel-like and prism-like facets and wherein the transparent reinforcing web is centered in the cured layer.

15. The panel of claim 14 laminated to a pane of glass.

References Cited

UNITED STATES PATENTS

| | | | |
|---|---|---|---|
| 2,782,544 | 2/1957 | Tobin | 161—2 |
| 3,328,499 | 6/1967 | Barnette | 264—108 |
| 3,306,956 | 2/1967 | Barnette | 264—1 |

JACOB H. STEINBERG, Primary Examiner

U.S. Cl. X.R.

206—46; 264—316